June 15, 1943.  J. H. WILSON  2,321,565
CLUTCH
Filed July 15, 1940    2 Sheets-Sheet 1
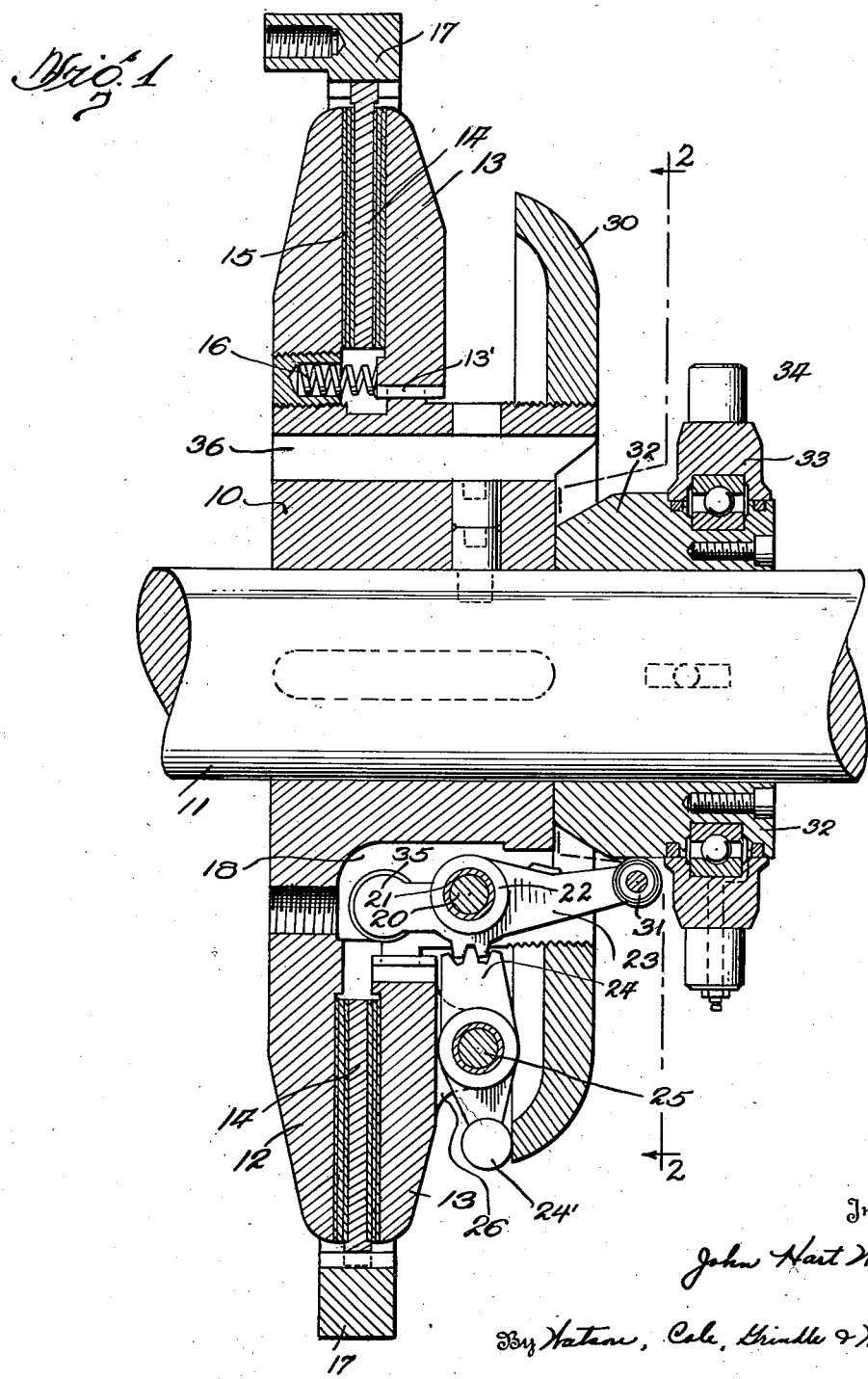

June 15, 1943. J. H. WILSON 2,321,565
CLUTCH
Filed July 15, 1940   2 Sheets-Sheet 2
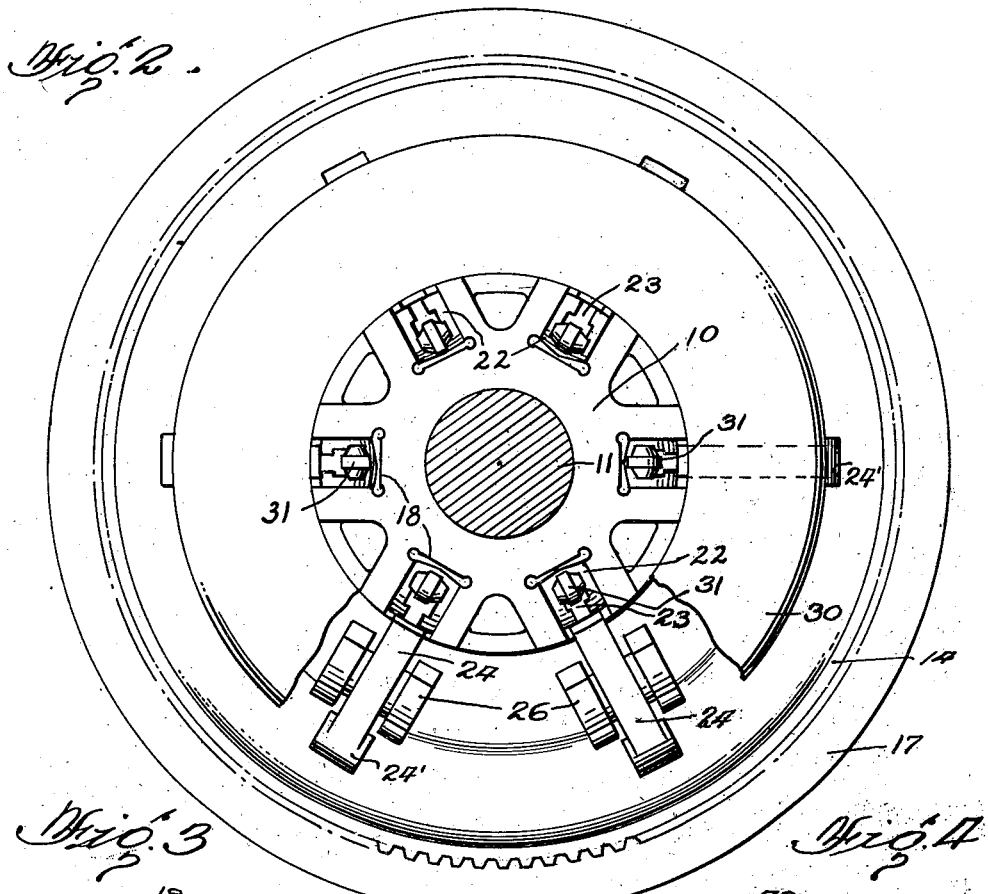
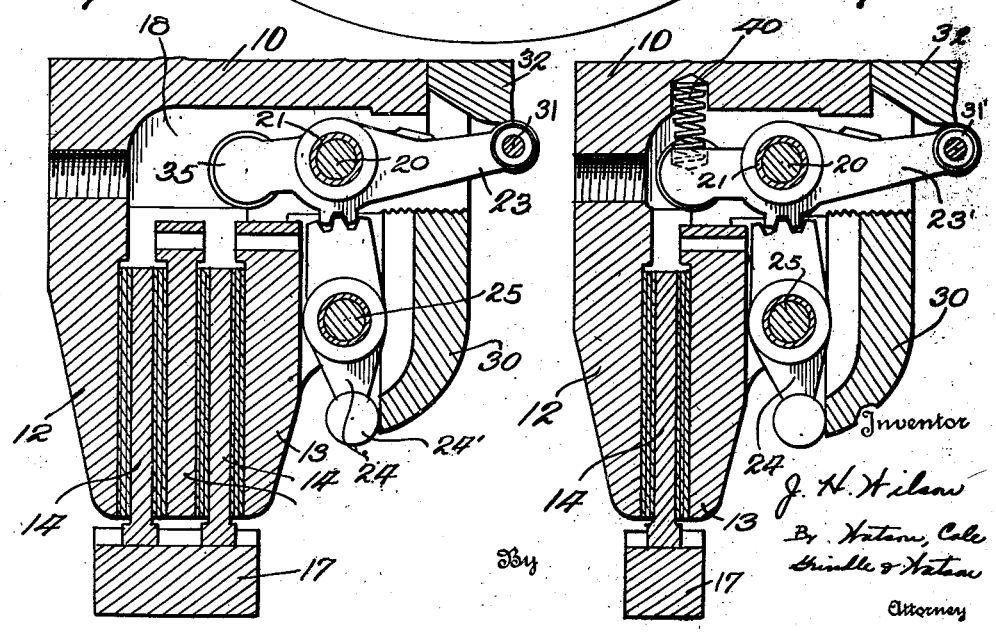

Patented June 15, 1943

2,321,565

UNITED STATES PATENT OFFICE 2,321,565

CLUTCH

John Hart Wilson, Wichita Falls, Tex.

Application July 15, 1940, Serial No. 345,665

3 Claims. (Cl. 192—68)

This invention relates to clutches and particularly to clutches of the friction plate type so widely made use of for operatively connecting driving and driven members. A clutch of this type embodies as essential elements one or more friction plates together with friction plate clamping means, the plate being mounted upon one member, either the driving or driven member, and the clamping means being mounted upon the other. Associated with the clamping means is the clutch operating mechanism including, in the usual case, a device for making suitable adjustments to compensate for the wear which occurs when the plate is in use.

One purpose of the invention is to provide a clutch which is so constructed that it will have substantially less tendency to become overheated when in use. As is well-known, clutches of the friction type will rather rapidly become heated when there are frequent clutch engagements and disengagements, causing warping of the various parts and excessive wear. The improved design is such that those parts which normally become excessively heated are maintained relatively cool but without resort to liquid cooling appliances, the heat being conducted away entirely by means of flowing air streams passing over surfaces of the clutch, the air streams being generated by centrifugal action during rotation of the clutch.

A primary purpose of the invention, however, is to provide an improved clutch operating mechanism by means of which a clutch of the plate type will have, for a given area of contact between the interengaging clutch surfaces, considerably increased holding power for a given applied effort. Pressure applied by an operator upon the clutch operating element produces an increased clamping pressure of the clamping plates against the friction plate or plates by reason of the greater mechanical advantage of the novel operating means and the superior manner in which the pressure is applied to the clamping plates. Likewise the clutch embodies means whereby wear of the inner engaging surfaces can be quickly and accurately compensated for, this means being of simpler nature than any generally similar means heretofore suggested as suitable for use in association with a clutch of the friction plate type. The improved clutch is likewise of simpler construction, is more easily assembled and disassembled than clutches of this type heretofore suggested and less costly to manufacture and maintain in operation.

In the accompanying drawings two modified forms of the clutch are disclosed by way of example but it will be appreciated by one skilled in the art that minor changes in design and arrangement of its component elements may be made without departure from the invention.

In the drawings:

Figure 1 is an axial section through the clutch, the interengaging elements being in close contact for the transmission of power;

Figure 2 is a view taken on the line 2—2 of Figure 1;

Figure 3 is a partial axial section through a clutch of slightly modified type; and Figure 4 is a similar section through a further modification.

The shaft indicated at 11 in the drawings may be either a driving or a driven shaft but, for the purpose of convenience in describing the nature and mode of operation of the invention, it will be designated a driven shaft. Fixed on shaft 11 is a hub 10 and formed integrally with the hub 10 and extending radially outwardly therefrom, is an annular flange 12, the inner face of which is disposed in a plane normal to the axis of shaft 11. Disposed parallel to the flange 12 and spaced slightly therefrom is an annular plate 13, the inner face of this plate being parallel to the inner face of the flange 12 so that these faces will, when moved toward each other, frictionally grip the opposed faces of an intermediate annular driving plate 14. It will be understood that friction material such as indicated at 15 may be and is preferably interposed between the mutually facing surfaces of the driving plate 14 and the members 12 and 13, which members will be hereinafter designated clamping plates, the arrangement being such that the friction material may be replaced from time to time when it becomes worn in the operation of the clutch.

While the flange or clamping plate 12 of the clutch is rigid with the hub 10, the annular clamping plate 13 has a splined connection with the hub at 13' and may be moved axially of the hub in well-known manner while at all times being constrained to rotate with the hub. Compression springs 16, of which there may be several, normally urge clamping plate 13 away from plate 12 so that the driving plate 14 is automatically released by the clamping plates 12 and 13 when the clutch operating mechanism is released by the operator. The periphery of the driving plate 14 is provided with teeth which mesh with teeth formed upon the inner surface of the annular driving ring 17 which encircles the driving plate, the driving ring 17 being in turn connected to any suitable driving means by which it may be driven in the usual manner. The driving plate 14 may have minor movements axially of shaft 11 and with respect to the driving ring 17 in order that the clamping plates will always bear against the opposite faces of the driving plate with equal force when the clutch is engaged.

It will be observed that the hub 10 has a number of outwardly opening substantially radial slot-like recesses 18 and that there is, in each of these recesses, a transversely extending operating lever pivotal support 20, encircled by a bearing sleeve 21, the support 20 and sleeve 21 extending through a cylindrical hub 22 in clutch operating lever 23 and mounted in hub 10. Associated with each clutch operating lever 23 is a second operating lever 24 which is supported upon pin 25 extending parallel to pin 20 and the ends of which are supported in spaced parallel ears 26 projecting laterally from the face of clamping member 13. Operating levers 23 and 24 are operatively connected, the inner end of lever 24 being toothed and the adjacent portion of lever 23 being likewise provided with teeth which mesh with those on the end of lever 24. Obviously, therefore, when rocking movement is imparted to lever 23 this movement is communicated to lever 24. The outer end of lever 24, which is indicated at 24', at all times bears against the outer edge surface of the adjustable abutment ring 30, which is threaded upon the hub 10 as shown. One end of lever 23 is provided with a roller 31 which at all times bears against the surface of an operating member or collar 32 of generally conventional type, the operating collar being encircled by a ring 33, carrying trunnions 34 adapted to be engaged by a shifter fork for the purpose of effecting sliding movement of the operating collar 32 longitudinally of shaft 11.

The opposite end of each operating lever 23 is provided with a counterweight 35 which functions to counteract the tendency of the roller 31 to move outwardly under the action of centrifugal force when the clutch is rotating at relatively high speed.

It will be clear that movement of the collar 32 will effect simultaneous rocking movements of all of the levers 23 and hence simultaneous rocking movements of the secondary levers 24. As the collar 32 is moved toward the left (Figure 1), from fully disengaged position, toward engaged position, the rollers 31 will first be thrust outwardly by the action of the conical inner end surface of the collar and this outward movement of each roller 31 causes the operating lever 24 to move in a counterclockwise direction, thrusting the end 24 of this lever against the adjacent edge face of the adjustable abutment member 30 and thereby imparting a thrust against the movable clamping plate 13, forcing this plate toward the plate 12 and tightly clamping in between the plates 12 and 13 the driving plate or disc 14.

It will be observed that the pivotal supports for the operating levers 24 are outside of the inner edge of the driving plate 14 and hence forces transmitted to the axially shiftable clamping plate 13 are communicated directly through that plate to the clamping plate. This is of advantage, promoting more uniform distribution of clamping force over the clamping plates and the driving plate and is a construction more rugged and durable than those generally heretofore employed, in which the pressure of the clutch operating mechanism is applied to a clamping plate at a point inside of the inner edge of the driving plate. Furthermore, it will be perceived that the effect of the operating lever 24 is to double, by reason of its mechanical advantage, the force applied to its inner end by the operating lever 23, thus forcing the clamping plate 13 toward the clamping plate 12 more strongly but at less speed than has been the case with clutch operating mechanisms of generally similar type heretofore proposed. For a given effort applied upon the collar 32, therefore, a much greater effective force is exerted on the driving plate 14 by the clamping plates 12 and 13 and, for a given effort, a much greater holding power is realized. Adjustments may be readily effected by rotation of the adjustable abutment ring 30, toward or away from the clamping plate 13 and any suitable device may be employed for locking abutment ring 30 in any desired position of adjustment.

It will be observed that operating levers 23 by no means fill the slots 18 and these slots serve, in addition to recesses for the reception of the operating levers, as conduits for the passage of cooling air, the air entering the slots at the ends thereof adjacent the collar 32 and then being thrown outwardly between the adjustable abutment 30 and clamping plate 13, sweeping over the faces of the metallic elements and exerting a strong cooling tendency thereon. Likewise, when the clutch is released and clamping plates 12 and 13 have been disengaged from the driving plate, air can pass outwardly over the surfaces of the friction material 15, exerting a strong cooling effect upon this material, all of which is highly desirable. Additional recesses or apertures such as 36 are provided for the passage of air and to lighten the weight of the clutch mechanism.

In the form of the invention shown in Figure 3 two friction plates are employed instead of a single plate but otherwise the clutch mechanism is identical with that described. In the form of the invention shown in Figure 4 a spring 40, extending radially of the hub, is associated with each of the operating levers 23', the inner end of the spring being housed within a recess formed in the hub and the outer end being housed within a recess formed in the weighted end of the operating lever. It is the function of the spring to assist the action of centrifugal force in preventing the opposite end of the operating lever from moving outwardly under the influence of centrifugal force when the clutch is in rapid rotation.

Having thus described the invention, what is claimed as new and desired to be secured by Letters Patent is:

1. In a clutch construction, in combination, a hub mounted for rotation about an axis, parallel first and second annular members concentric with and disposed normally to said axis, said members being rigid with and projecting outwardly from the hub, a third member intermediate said first and second members and mounted on the hub for movement longitudinally thereof and rotation therewith, a plate to be clamped, said plate being positioned between said intermediate member and the first of said fixed annular members, a lever disposed radially of the hub and pivotally mounted on said intermediate member, one end of said lever being adapted to bear against said second member, said lever when actuated acting to move said intermediate member toward the first fixed member to clamp said plate.

2. The combination set forth in claim 1 in which the outer end of the said lever is adapted to bear against said second member and the inner end of said lever is adapted to be operatively connected to an actuating element.

3. The combination set forth in claim 1 in which a second lever is pivotally mounted on said hub and is operatively connected to the inner end of said first lever for the purpose of actuating the same.

JOHN HART WILSON.